(12) United States Patent
Essary

(10) Patent No.: US 9,802,700 B1
(45) Date of Patent: Oct. 31, 2017

(54) VTOL ROTARY AIRCRAFT AND METHOD OF USE

(71) Applicant: Jonathan M. Essary, Arlington, TX (US)

(72) Inventor: Jonathan M. Essary, Arlington, TX (US)

(*) Notice: Subject to any disclaimer, the term of this patent is extended or adjusted under 35 U.S.C. 154(b) by 104 days.

(21) Appl. No.: 14/824,467

(22) Filed: Aug. 12, 2015

Related U.S. Application Data

(60) Provisional application No. 62/079,119, filed on Nov. 13, 2014.

(51) Int. Cl.
*B64C 3/00* (2006.01)
*B64C 39/02* (2006.01)
*B64C 27/00* (2006.01)

(52) U.S. Cl.
CPC ............ *B64C 39/024* (2013.01); *B64C 27/00* (2013.01); *B64C 2201/10* (2013.01)

(58) Field of Classification Search
CPC ... B64C 39/024; B64C 27/00; B64C 2201/10; B64C 2201/141; A63H 27/00; A63H 27/12
See application file for complete search history.

(56) References Cited

U.S. PATENT DOCUMENTS

| | | | | |
|---|---|---|---|---|
| 3,107,071 A * | 10/1963 | Wessels | ............... | B64C 39/001 180/129 |
| 3,195,665 A * | 7/1965 | Beardsley | .............. | B60V 1/046 180/116 |
| 3,276,723 A * | 10/1966 | Miller | ................ | B64C 29/0025 244/12.2 |
| 3,489,374 A * | 1/1970 | Morcom | ................ | B64C 39/06 244/12.2 |
| 3,508,360 A * | 4/1970 | Williams | ............... | A63H 27/12 102/359 |
| 3,747,726 A * | 7/1973 | Walter | .................... | B60V 1/02 180/116 |
| 3,811,527 A * | 5/1974 | Pont | ........................ | B60V 1/06 180/117 |
| 4,313,512 A * | 2/1982 | Jutras | ..................... | B60V 1/04 180/117 |
| 5,170,963 A * | 12/1992 | Beck, Jr. | ............... | B64C 39/064 244/12.2 |
| 6,616,094 B2 * | 9/2003 | Illingworth | .......... | B64C 11/001 244/12.1 |
| 7,581,608 B2 * | 9/2009 | St. Louis | ................ | B60V 1/06 180/116 |
| 9,162,764 B2 * | 10/2015 | Babinsky | .............. | B64C 39/064 |
| 2002/0047071 A1 * | 4/2002 | Illingworth | .......... | B64C 11/001 244/199.1 |
| 2007/0017722 A1 * | 1/2007 | St. Louis | ................ | B60V 1/06 180/116 |

(Continued)

*Primary Examiner* — Philip J Bonzell
(74) *Attorney, Agent, or Firm* — Eldredge Law Firm; Richard Eldredge

(57) ABSTRACT

A rotary aircraft includes a cylindrical enclosure configured to form an open housing with a top opening and a bottom opening; a hover disc disposed within the open housing of the cylindrical enclosure and configured to direct airflow entering through the top opening, the hover disc forming a center opening; and a fan extending through the center opening of the hover disc and configured to direct airflow through the hover disc.

9 Claims, 6 Drawing Sheets

(56) References Cited

U.S. PATENT DOCUMENTS

2008/0302920 A1* 12/2008 Mack .................... B64C 39/064
                                                                244/23 R
2012/0068021 A1*  3/2012 Babinsky ............. B64C 39/064
                                                                244/23 R

* cited by examiner

VTOL ROTARY AIRCRAFT AND METHOD OF USE

BACKGROUND

1. Field of the Invention

The present invention relates generally to rotary aircraft, and more specifically, to a vertical take-off and landing (VTOL) aircraft.

2. Description of Related Art

VTOL rotary aircraft are well known in the art and are effective means to provide vertical and horizontal lift capabilities during flight. For example, FIG. 1 depicts a VTOL rotary aircraft 101 in accordance with a well-known embodiment. In the exemplary embodiment, aircraft 101 is a helicopter having a fuselage 103 and a rotor system 105 with a plurality of rotor blades 107 to create vertical and horizontal flight movement.

One problem commonly associated with aircraft 101 is the limited use. For example, it should be understood that rotor blades are exposed, thereby creating a potentially harmful situation to persons nearby. These features make the aircraft undesirable in scenarios wherein aircraft 101 is used as a drone.

Accordingly, there is a long-felt need for a safer rotary aircraft providing vertical and horizontal flight.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
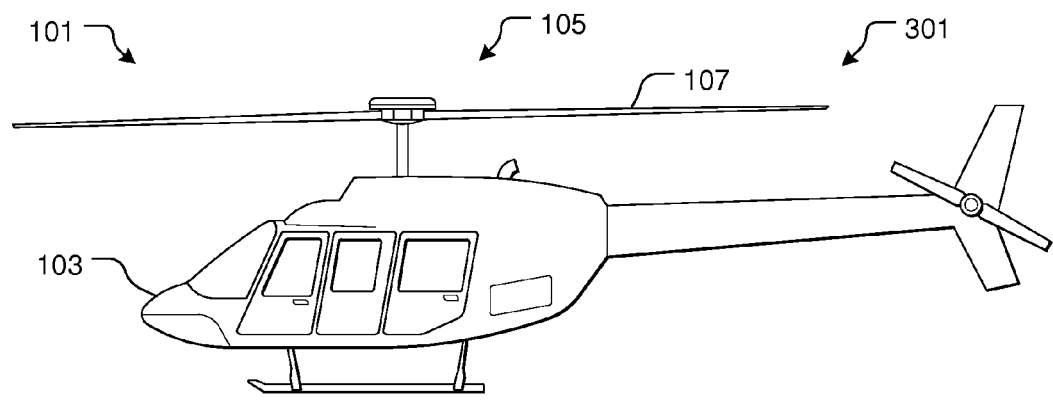
FIG. 1 is a simplified schematic of a conventional rotary aircraft.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional VTOL aircraft. Specifically, the VTOL aircraft of the present application provides rapid and effective means maneuver horizontal and vertical flight motion without the fear of being struck by an impeller. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
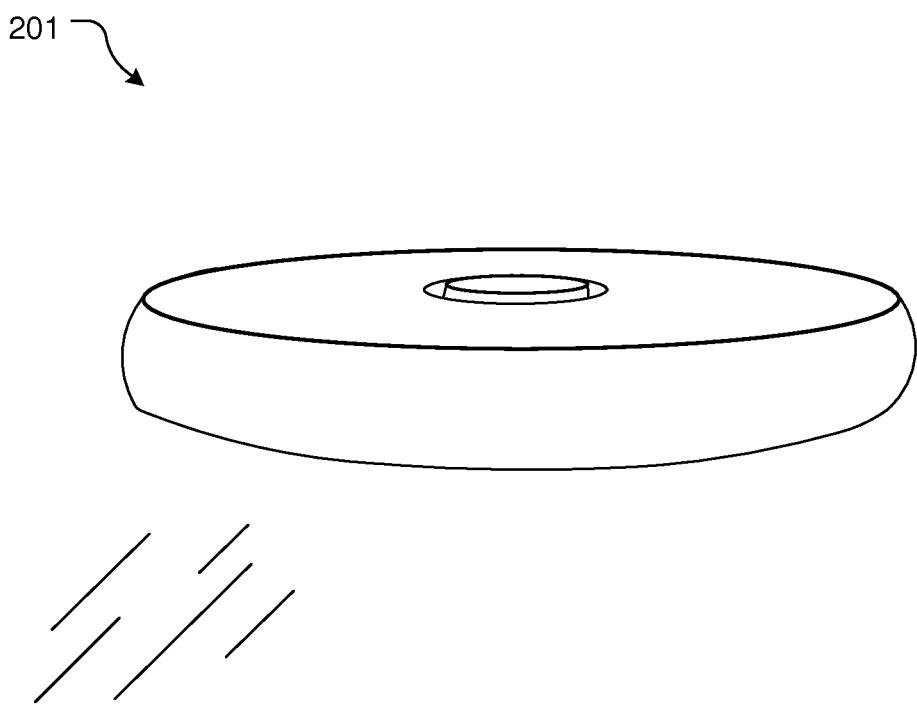
FIG. 2 is an oblique view of a VTOL aircraft in accordance with a preferred embodiment of the present application.

Referring now to the drawings wherein like reference characters identify corresponding or similar elements throughout the several views, FIG. 2 depicts an oblique view of an aircraft 201 in accordance with a preferred embodiment of the present application. It will be appreciated that aircraft 201 overcomes the problems commonly associated with conventional aircraft.

Figure 3:
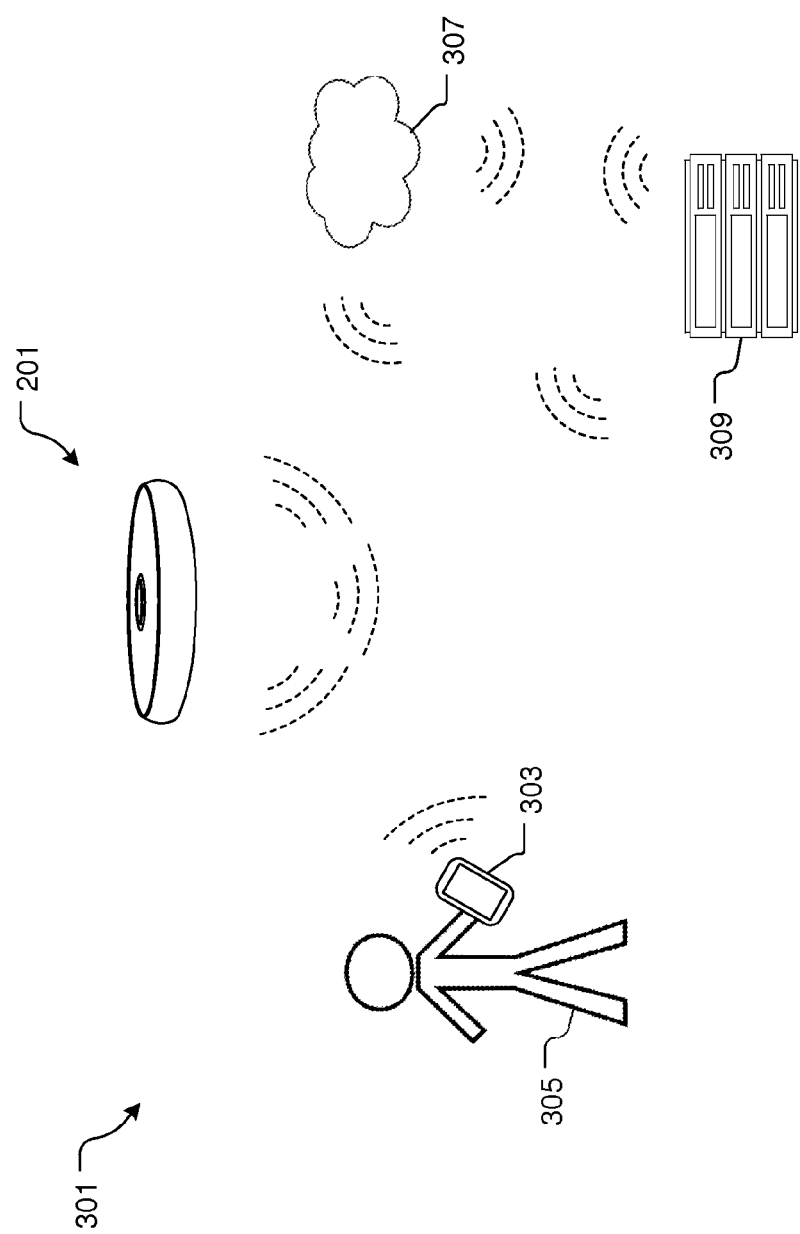
FIG. 3 is a simplified schematic of a VTOL aircraft system.

Aircraft 201 could be utilized with a control system 301, as depicted in FIG. 3, wherein the aircraft 201 is a drone manipulated by a controller 303 by user 305 and/or by a computer 309 via a wireless means, e.g., a cloud service provider 307. Accordingly, it is contemplated autonomously and manually controlling the aircraft 201 during flight. It will also be appreciated that the system could further include sensors, cameras, and/or other devices carried by aircraft 201 for collecting and relaying data information to controller 303 and/or computer 309.

Figure 4:
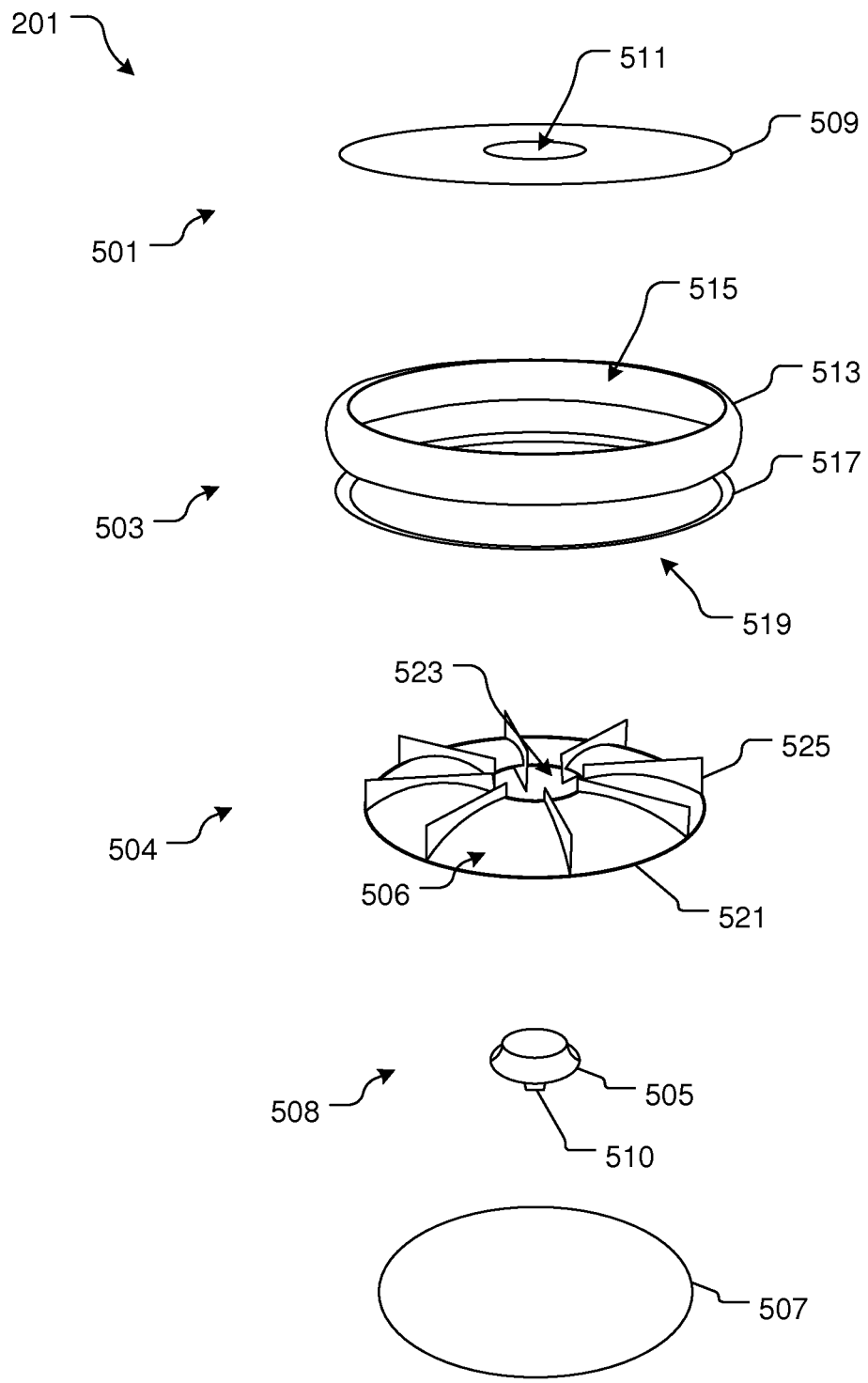
FIG. 4 is a disassembled view of the VTOL aircraft of FIG. 2.

In FIG. 4, an exploded detailed front view of the components of aircraft 201 are shown. Aircraft 201 includes one or more of a top plate 501 having a body 509 that forms an opening 511, an enclosure 503 having a body 513 configured to secure to top plate 509 and forms an opening 515, an exhaust vent 517 that fits within enclosure 513 and forms an opening 519, a hover disc 504 having a body 521 that forms an opening 523 and includes a plurality of vertical vanes 525 extending therefrom a contoured surface 506, a driver 508 having a motor 510 rotatably attached to a centrifugal fan 505 and a bottom plate 507.

In the contemplated embodiment, a centrifugal fan is used; however, it will be appreciated that other types of propulsion device could be used in lieu of a fan. For example, a rotary system having a plurality of blades, a jet turbine, and the like are also contemplated in an alternative embodiment.

Figure 5:
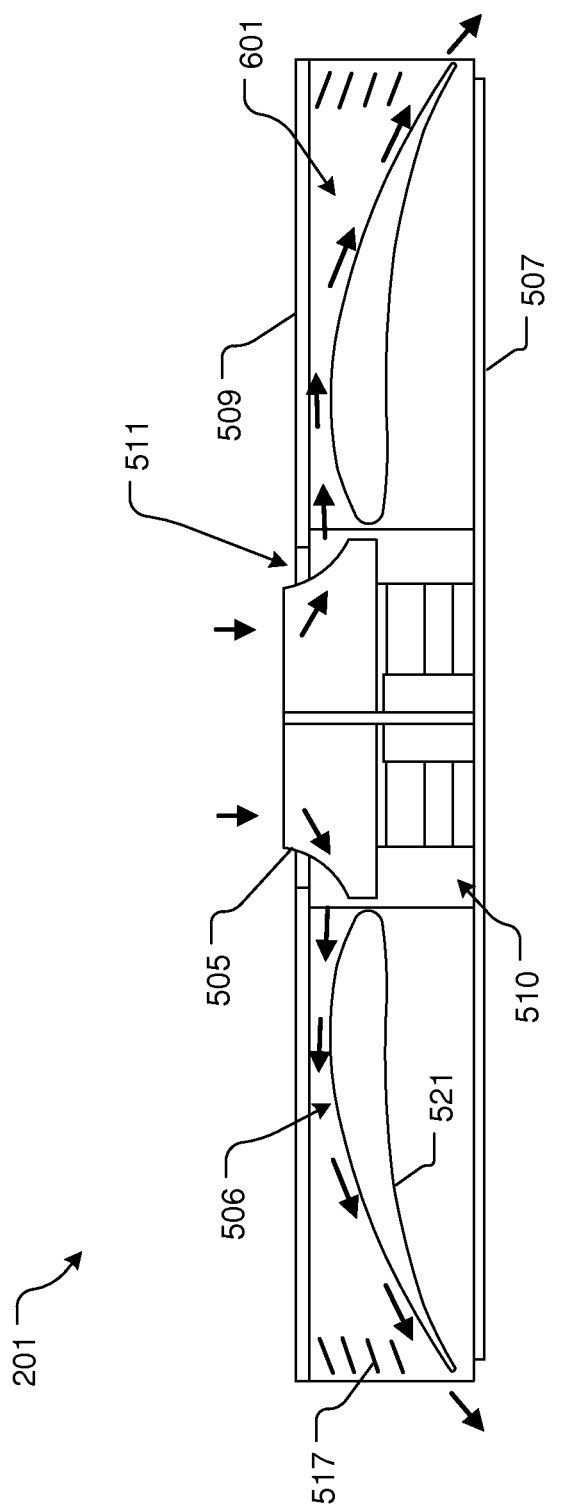
FIG. 5 is a cross-sectional view of the VTOL aircraft of FIG. 2.

When assembled, the fan 505 extends through opening 523 and 511, and as shown in FIG. 5, directs airflow through opening 511 to the top contoured surfaces 506 of body 521, as depicted with a plurality of arrows. It will be appreciated that the fan 505 forces the air flow over the contoured surfaces 506, which in turn creates lift. The airflow is further manipulated with the exhaust vents 517 for vertical and horizontal movement.

It will be appreciated that enclosure 513, top plate 501, vents 517, and bottom plate 507 prevent fingers and other appendages of the user from coming into contact with the rotating members of aircraft 201, thus preventing harm to the user.

Figure 6:
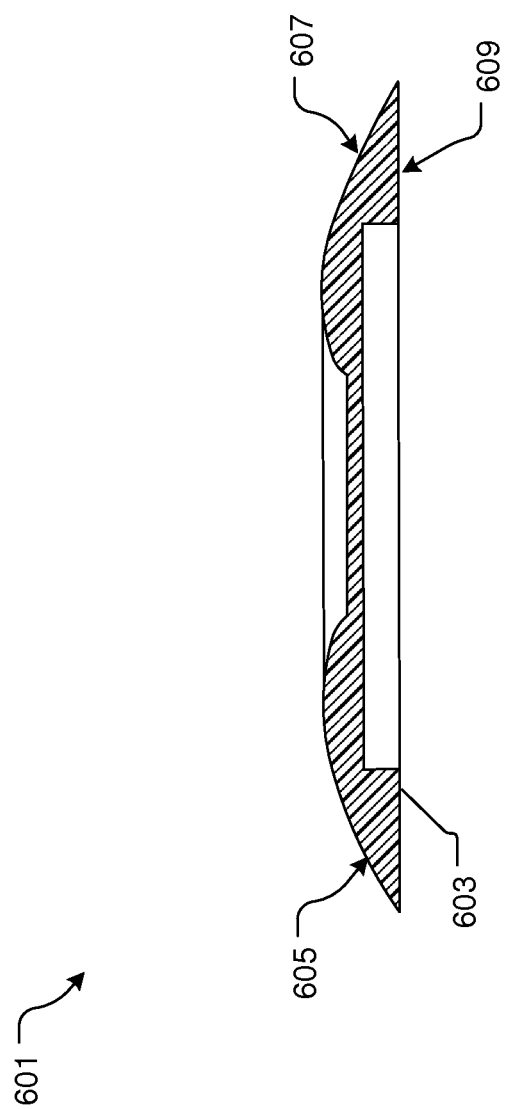
FIG. 6 is a cross-sectional view of a VTOL aircraft in accordance with an alternative embodiment of the present application.

Referring now to FIG. 6, a cross-sectional view of a hover disc 601 is shown in accordance with an alternative embodiment of the present application. It will be appreciate that system 201 could utilizes the features of disc 601. In this contemplated embodiment, disc 601 includes a single body 603 having opposing contoured surfaces 605, 607 for creating lift. A bottom surface 609 is configured to run relatively parallel to the bottom plate.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotary aircraft, comprising:
  a cylindrical enclosure having a vertical wall forming an open housing with a top opening and a bottom opening;
  an exhaust vent integrated into the vertical wall;
  a hover disc disposed within the open housing of the cylindrical enclosure and configured to direct airflow entering through the top opening, the hover disc having:
    a top surface with two opposing contoured surfaces positioned below the exhaust vent;
    a bottom flat surface;
    a center opening; and
    a plurality of vanes extending from the opposing contoured surfaces, the plurality of vanes having a fin shape;
  a top plate secured to the cylindrical enclosure;
  a bottom plate secured to the cylindrical enclosure; and
  a fan extending through the center opening of the hover disc and configured to direct airflow over the two opposing contoured surfaces of the hover disc;
  wherein the cylindrical enclosure prevents contact with the fan during rotational movement.

2. The aircraft of claim 1, wherein the top plate includes an opening in gaseous communication with the fan; and
  wherein airflow travels through the opening to the fan and then to the hover disc.

3. The aircraft of claim 1, wherein the aircraft is autonomously controlled.

4. The aircraft of claim 1, further comprising:
  a driver configured to rotate the fan.

5. The aircraft of claim 4, wherein the driver is a battery powered electric motor.

6. A drone rotary aircraft, comprising:
  a cylindrical enclosure having a vertical wall forming an open housing with a top opening and a bottom opening;
  an exhaust vent integrated into the vertical wall;
  a hover disc disposed within the open housing of the cylindrical enclosure and configured to direct airflow entering through the top opening, the hover disc having:
    a top surface with two opposing contoured surfaces positioned below the exhaust vent;
    a bottom flat surface;
    a center opening; and
    a plurality of vanes extending from the opposing contoured surfaces, the plurality of vanes having a fin shape;
  a top plate secured to the cylindrical enclosure;
  a bottom plate secured to the cylindrical enclosure; and
  a fan extending through the center opening of the hover disc and configured to direct airflow over the two opposing contoured surfaces of the hover disc;
  wherein the cylindrical enclosure prevents contact with the fan during rotational movement.

7. The drone aircraft of claim 6, wherein the top plate includes an opening in gaseous communication with the fan; and
  wherein airflow travels through the opening to the fan and then to the hover disc.

8. The drone aircraft of claim 6, further comprising:
  a driver configured to rotate the fan.

9. The drone aircraft of claim 8, wherein the driver is a battery powered electric motor.

* * * * *